March 11, 1958 J. MAILLARD 2,826,339
APPARATUS FOR MIXING DIFFERENT KINDS OF MATERIAL
IN PREDETERMINED PROPORTIONS
Filed Jan. 9, 1956 7 Sheets-Sheet 1
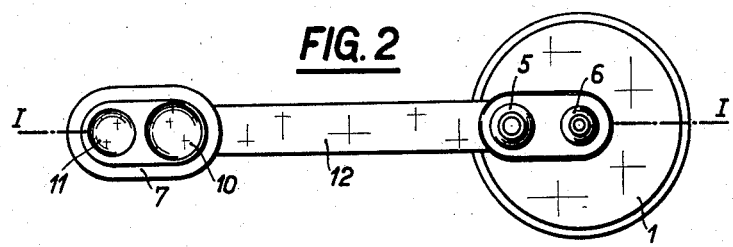
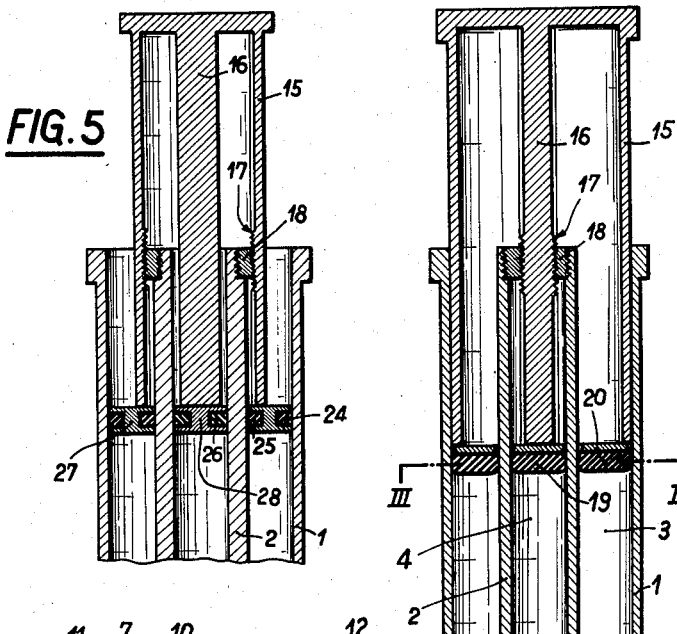
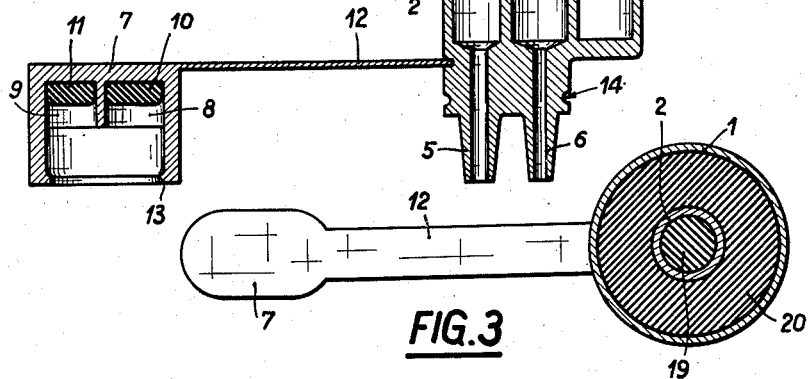
INVENTOR
JULES MAILLARD March 11, 1958 J. MAILLARD 2,826,339
APPARATUS FOR MIXING DIFFERENT KINDS OF MATERIAL
IN PREDETERMINED PROPORTIONS
Filed Jan. 9, 1956 7 Sheets-Sheet 2

INVENTOR
JULES MAILLARD

March 11, 1958  J. MAILLARD  2,826,339
APPARATUS FOR MIXING DIFFERENT KINDS OF MATERIAL
IN PREDETERMINED PROPORTIONS
Filed Jan. 9, 1956  7 Sheets-Sheet 4

INVENTOR
JULES MAILLARD
BY
Attys.

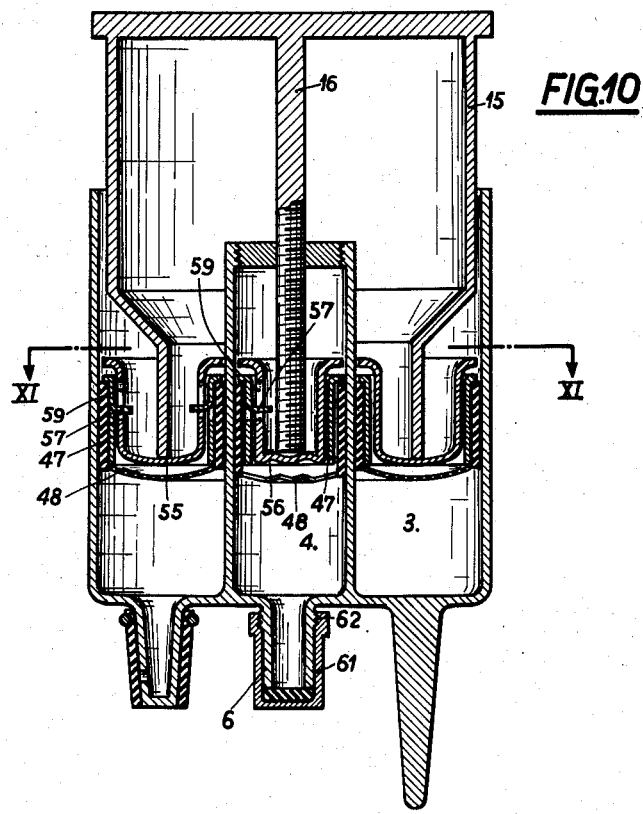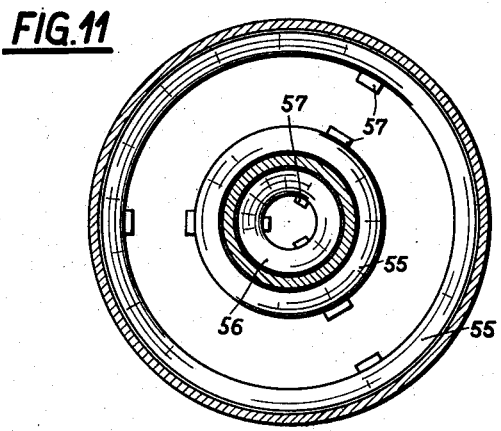

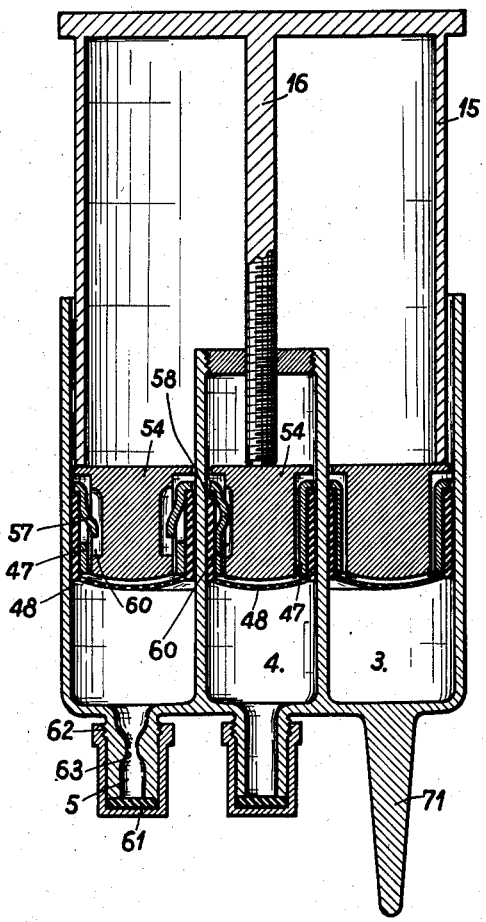

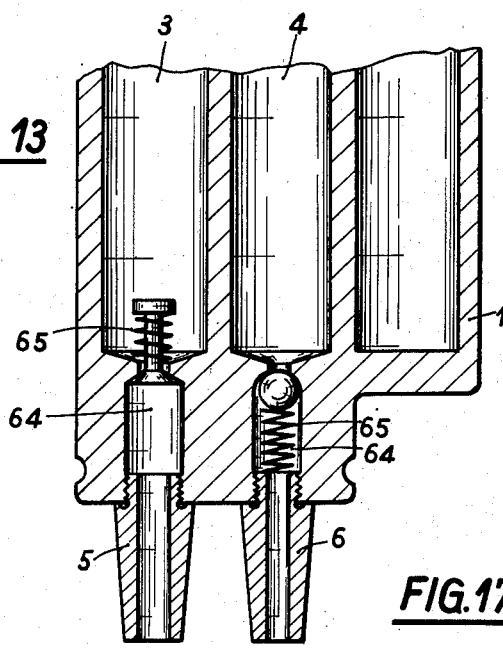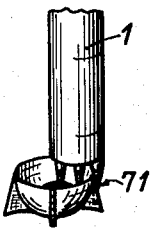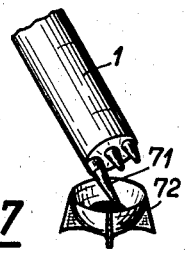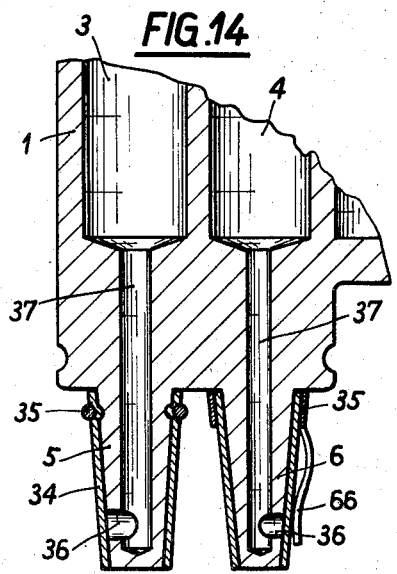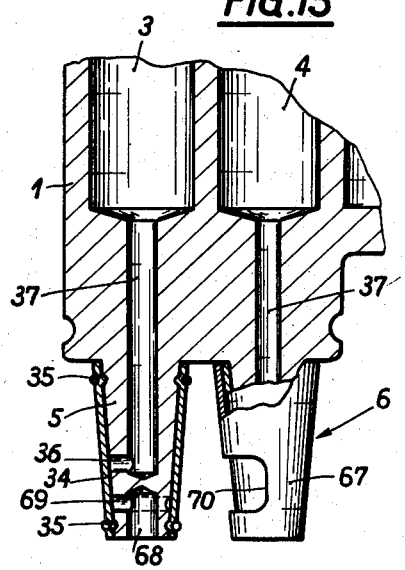

United States Patent Office 2,826,339
Patented Mar. 11, 1958

2,826,339

APPARATUS FOR MIXING DIFFERENT KINDS OF MATERIAL IN PREDETERMINED PROPORTIONS

Jules Maillard, Fribourg, Switzerland

Application January 9, 1956, Serial No. 558,093

Claims priority, application Switzerland January 14, 1955

20 Claims. (Cl. 222—137)

My invention has for its object an apparatus for the mixture in predetermined proportions of different materials.

According to my invention, I provide a container including at least two compartments containing each one of the materials to be mixed and provided each with an exhaust pipe, the exhaust pipes being arranged in side by side relationship while material expelling means act simultaneously on all the compartments so as to make them feed each amounts of material proportional to their contents.

I have illustrated by way of example in accompanying drawings six preferred embodiments of my invention together with modifications thereof. In said drawings:

Fig. 1 is an axial cross-section of a first embodiment.

Fig. 2 is an endwise view thereof as seen from the bottom upwardly.

Fig. 3 is a cross-section through line III—III of Fig. 1.

Figs. 4 and 5 are partial cross-sectional views illustrating detail modifications.

Fig. 10 is an axial cross-section of a fifth embodiment.

Fig. 11 is a cross-section through line XI—XI of Fig. 10.

Fig. 12 is an axial cross-section of a sixth embodiment.

Figs. 13, 14 and 15 are partial axial sectional views of three modifications of Fig. 1.

Figs. 16 and 17 are perspective views illustrating a manner of using the arrangement of Figs. 4, 7, 8, 10 and 12.

Figure 4:
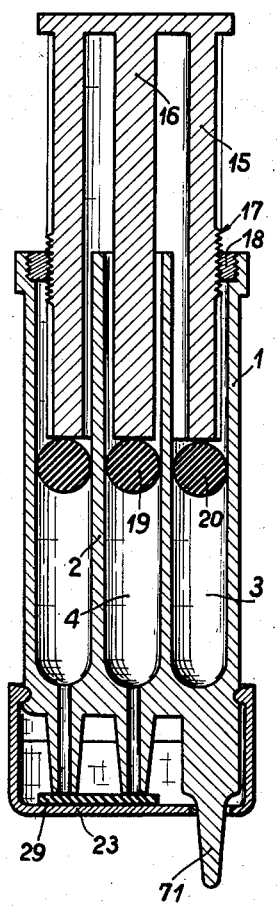

The apparatus illustrated in Fig. 1 includes a cylindrical container 1 subdivided into two coaxial cylindrical compartments 3 and 4 through the agency of a sleeve shaped element 2 arranged coaxially inside the container 1. At the lower ends of the compartments 3 and 4, there are provided exhaust pipes 5 and 6 over which may be folded down a cover 7 provided with two recesses 8 and 9 registering in the folded condition of the cover with the two pipes and at the bottom of which are fitted two fluidtight packings 10 and 11.

The cover 7 is connected with the container 1 through a strip of yielding material 12 and it carries an inner annular rib 13 along its opening, said rib being adapted to engage with a force fit inside an annular groove 14 provided round the common inner end of said pipes 5 and 6 when the cover is positioned over said pipes The compartments 3 and 4 of the container 1 are adapted to contain any desired liquid viscous or pasty material to be ejected through the pipes 5 and 6 under the control of material-expelling means constituted by a dual piston 15—16, the elementary pistons of which are rigid with each other and engage each the corresponding compartments 3 and 4 in a direction parallel with their axes so that they may feed through said compartments amounts of material which are proportional to their contents.

The piston 16 is provided with an outer thread 17 engaging a tapped member 18 secured to the end of the container compartment 4 which is opposed to that provided with the pipe 6, said piston carrying at its outer end a disc-shaped fluidtight packing 19, the diameter of which is equal to the inner diameter of the compartment 4. The piston 15, which is in the shape of a hollow cylinder the outer diameter of which corresponds with the inner diameter of the container 1, carries at its outer end an annular fluidtight packing 20, the cross-sectional area of which is such that it fits fluidtightly between the outer and inner cylindrical walls of the compartment 3 in the container 1. As the pistons revolve round their axis, the container 1 remains stationary and the piston 16 sinks gradually inside the tapped member 18 on the compartment 4 as provided by the engagement between the thread 17 and said tapped member 18. The piston 16 carries along with it through the compartment 3 the piston 15 which is rigid with said piston 16. This produces a simultaneous projection of the materials contained in the two compartments through the pipes 5 and 6 in proportions corresponding to their contents. The thread 17 may be provided as well on the piston 15 for cooperation with a tapped or threaded member 18 fitted between the piston and one of the walls of the compartment 3 as illustrated in Figs. 4 and 5.

The heads of the pistons, instead of being constituted by the packings 19 and 20, may carry, as illustrated in Fig. 5, three annular fluidtight packings 24, 25 and 26 arranged coaxially in grooves provided in the actual piston heads 27 and 28 at the lower ends of said pistons in a manner corresponding to the piston heads 19 and 20 illustrated in Fig. 1, or else they may be constituted by spherical and annular elements independent of the pistons 15 and 16 as illustrated in Fig. 4, which cuts out the possibility of any air entering through the exhaust pipes whenever the pistons are operated so as to move upwardly. In this latter case, the lower ends of the compartments 3 and 4 should be given a shape such that at the end of the downward piston stroke said spherical and annular elements 19 and 20 are housed accurately inside said suitably shaped ends.

Figure 6:
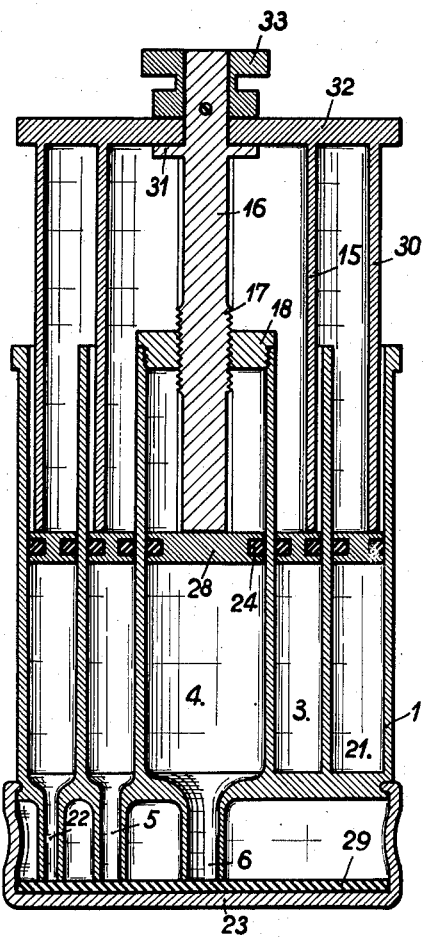
Figs. 6, 7 and 8 are axial cross-sections of a second, third and fourth embodiment respectively.

In the second embodiment illustrated in Fig. 6, the cylindrical container 1 is subdivided into three coaxial cylindrical compartments 3, 4 and 21, the lower ends of which open into exhaust pipes 5, 6 and 22 provided with a cover 23 at the bottom of which is fitted a fluidtight packing 29 similar to that illustrated in Fig. 4 and designated also by the reference 29. The material-expelling means include in this case three pistons arranged coaxially and rigid with each other, said pistons 15, 16 and 30 sliding respectively in the compartments 3, 4 and 21. The rod of the piston 16 is provided with a thread 17 at a point of its length for engagement with a tapped member 18 located at the upper end of the compartment 4 and said rod carries at its lower end a piston head 28 similar to that illustrated in Fig. 5. At the upper end of its rod, the piston 16 is provided with a shoulder 31 engaged by a disc 32 through the central perforation of which the upper end of the rod of the piston 16 extends, which rod carries at its extreme end a knurled ring 33 rigidly secured thereto and holding the disc 32 between it and the shoulder 31. The disc 32 is rigid with the outer pistons 15 and 30 which are carried along by said piston 16 during its longitudinal movement without being driven simultaneously into rotation.

Figure 7:
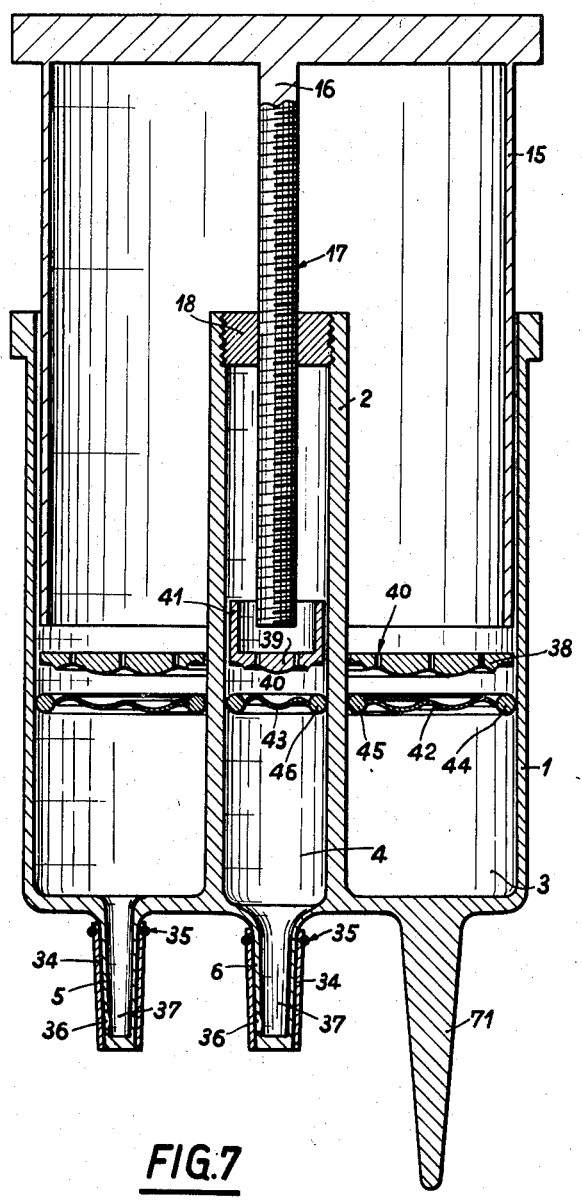

In the apparatus illustrated in Fig. 7, including cylindrical compartments 3 and 4, the exhaust pipes 5 and 6 are surrounded by an elastic sleeve 34 secured through an annulus 35 and covering the terminal port 36 of the channel 37 defined by the corresponding exhaust pipe 5 or 6, said terminal port 36 opening laterally of said exhaust pipe at right angles with the channel 37 aligned with the compartment 3 or 4. The piston 16 is again provided on its rod with a thread 17 cooperating with a tapped member 18 fitted at the upper end of the compartment 4. The piston 15 matching the shape of a cylinder is in one with the piston 16 but the heads of the pistons 15 and 16 are independent of the piston rods and include each a rigid disc 38 or 39 provided with perforations 40 and adapted to be depressed by the rods of the pistons 15 and 16. The disc 39 is rigid with a sleeve 41 extending above its periphery and housing the lower end of the rod of the piston 16 while it forms also a guiding member slidably engaging the wall 2 of the compartment 4. Underneath the discs 38 and 39 are arranged independently corresponding yielding diaphragms 42 and 43, the cross-sectional areas of which are equal to those of the corresponding rigid discs 38 and 39; said diaphragms are provided with fluidtight packings 44—45 and 46 along their edges in contacting relationship with the cylindrical walls of the compartments 3 and 4.

If, for any reason whatever, the material contained inside the compartments 3 and 4 of the apparatus contracts, the diaphragms 42 and 43 are deformed through the depression thus produced and move away from the rigid discs 38 and 39 so that air may pass through the ports 40 and allow this spacing between the diaphragms and the discs. This cuts out any possible entrance of air into the compartments 3 and 4 containing such material and the formation of air bubbles inside the latter while any possible damage to the material in contact with air, as long as they are stored inside the compartments 3 and 4 of the container, may thus be avoided.

If, in contradistinction, the material expands, the diaphragms 42 and 43 are deformed by the pressure produced in the direction of the rigid discs 38 and 39 provided however the pressure exerted by the pistons has been relieved after the feeding operation for instance by unscrewing the pistons by one or two revolutions. This cuts out the possibility of any untimely ejection of the material.

Figure 8:
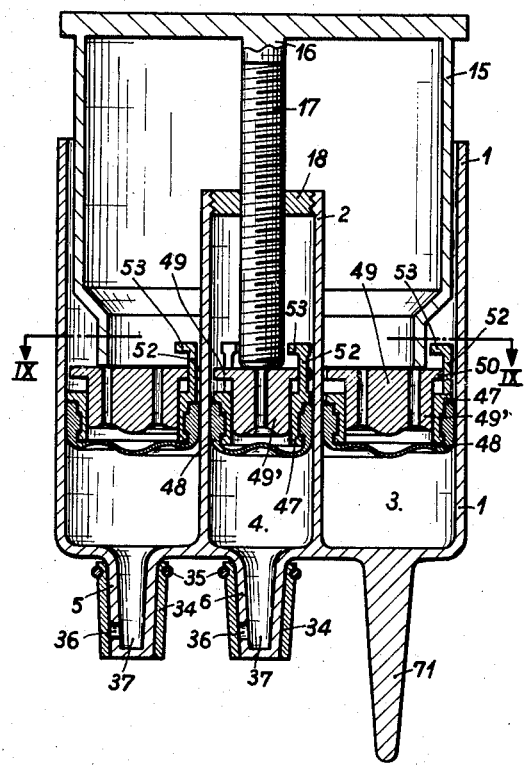
Figure 9:
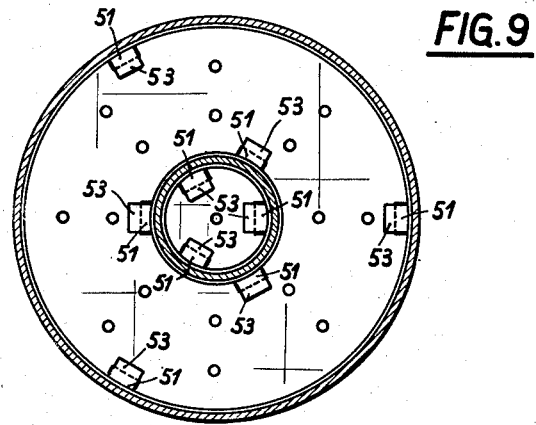
Fig. 9 is a cross-section through line IX—IX of Fig. 8.

In a fourth embodiment illustrated in Figs. 8 and 9, the piston heads are also independent of their control members and include on the one hand a reinforcement 47 constituted by a sleeve-shaped member fitted inside the compartment 4 and on the other hand two further sleeve-shaped reinforcing members 47 fitted inside the compartment 3 along the inner and outer walls thereof; a yielding diaphragm 48 is secured to the lower surface of the reinforcing sleeve of sleeves in each of the compartments 3 and 4 and is urged fluidtightly against the sidewalls of said compartments by said reinforcing sleeves; furthermore, the rigid members 49 provided with perforations parallel with the sidewalls of the compartments and subjected to the action of the members controlling the piston heads, shown at 15 and 16, are partly fitted inside the corresponding reinforcement 47 through their lower sections 49'; the upper sections 50 of said members 49 are provided with longitudinal grooves 51 engaged by lugs 52 carried by the reinforcements 47 and the free ends 53 of which are folded at right angles towards the inside of the corresponding compartments so as to limit the axial strokes of the rigid members 49 inside the reinforcements 47 between the diaphragms 48 and said free ends of the lugs 52.

The folded ends 53 of the lugs 52 prevent the rigid members 49 from being urged outwardly by the pressure of the material in the compartment beyond the reinforcements 47 and the grooves 51 in said members 49 engaged by the lugs 52 prevent any radial shifting of said members 49 with reference to the reinforcements 47. In the case of the reinforcements in the outer compartment 3, this structure prevents also any radial shifting of the sleeve-shaped elements of the reinforcements 47 with reference to each other. The free ends 53 of the lugs 52 folded at right angles inwardly of the compartments provide also means for drawing out the piston heads through the agency of a suitable tool before reloading the apparatus.

In the embodiments illustrated in Figs. 10, 11 and 12 which form modifications of the last described embodiment, the piston heads include each a reinforcement 47 similar to that of the apparatus illustrated in Fig. 8, provided at its lower end with a yielding diaphragm 48 and engaging a rigid member 54, 55 or 56 adapted to be actuated by the members 15 and 16 controlling the corresponding pistons. Each of the reinforcements 47 includes at least one tongue 57 (Fig. 10) or a boss 58 (Fig. 12) engaging either a slot 59 or a groove 60 extending in parallelism with the sidewalls of the compartment so as to prevent, on the one hand, the rigid members 54 or 55 and 56 from being urged out of the corresponding reinforcement 47 through the pressure exerted by the material in the compartments and, on the other hand, the two elements of the reinforcement 47 in the compartment 3 from moving radially with reference to each other.

Turning more specifically to the embodiment illustrated in Fig. 10, described hereinabove, the tongue 57 allows also an easy removal of the piston heads through the agency of a suitable tool at the moment of the reloading of the apparatus and the diaphragm 48 located inside the compartment 4 underneath the rigid member 56 is made of metal.

The exhaust pipe 6 for the compartment 4 is closed on the other hand by a tapped cap 61 removably screwed over the outer thread 62 on said pipe 6.

In the case of the embodiment illustrated in Fig. 12, the exhaust pipe 5 for the compartment 3 is also closed by a tapped cap 61 screwed over the outer thread 62 of said pipe, the channel 63 defined by said pipe 5 being throttled at a point of its length so as to brake the flow of the liquid contained inside the compartment 3 and to prevent its untimely running out when the cap 61 is removed.

Further modifications of the exhaust pipe shown in the different above-described arrangements are illustrated in Figs. 13, 14 and 15. The case is chiefly that of exhaust pipes provided with exhaust valves of the type described and illustrated in Fig. 7.

The valves illustrated in Fig. 13 are exhaust valves of a conventional type adapted to be shifted inside a recess 64, against the action of a spring 65, by the material urged out of the compartments 3 and 4 of the apparatus. The exhaust pipes 5 and 6 have their channels extending axially of the chambers or housings 64 into the lower ends of which they are screwed.

The valves illustrated in Fig. 14 are constituted by elastic sleeves 34 fitted over the frusto-conical surface of the ends of the exhaust pipes 5 and 6 round which they are secured through annuli 35 clamping their upper edges. The outwardly opening terminal sections 36 of the channels 37 in the exhaust pipes 5 and 6 which form extensions of the compartments 3 and 4 of the apparatus, are arranged at right angles with reference to the corresponding channels 37. Thus the material passing out of either compartment 3 or 4 of the apparatus urges outwardly a section of the sleeve 34 and spaces it with reference to the frusto-conical outer surface of the corresponding pipe 5 or 6 so that the material delivered flows thus between the said frusto-conical surface of each of the pipes and the sleeve surrounding same. The exhaust pipe 6 of Fig. 14 is furthermore provided with a spring blade 66 ensuring the fluidtight application over the lateral outlet 36 of the channel 37, of the corresponding section of the sleeve 34.

The valves illustrated in Fig. 15 are similar to those illustrated in Fig. 14 with the difference that they include two annuli 35 in the case of the pipe 5 or a rigid sleeve 67 in the case of the pipe 6, so as to secure fluidtightly in either case the ends of the sleeve 34 onto the frusto-conical surface of the exhaust pipe 5 or 6. The channel 37 in each of the exhaust pipes includes a terminal outlet section 36 at right angles with the end of the main section of the channel as already disclosed in the case of the arrangement illustrated in Fig. 14. The exhaust pipes illustrated in Fig. 15 include however at their outer ends a further channel section 68 coaxial with the main channel 37 and opening into the outer end of the pipe 5 with a web between it and said main channel 37; said channel 68 is connected with a further channel 69 arranged at right angles therewith and in parallelism with the terminal section 36 of the channel 37 so that the material delivered through the said terminal outlet section 36 of the channel 37 and entering the gap between the inner surface of the sleeve 34 and the outer surface of the pipe 5 may be fed into said channel 69 and thence into the channel 68 so as to be projected outwardly through the latter.

It is apparent that the rigid frusto-conical sleeve 67 fitted over the sleeve 34 surrounding the other pipe 6 in Fig. 15 is provided with a transverse notch 70 registering with the transverse channels 36 and 69 opening into the main channels 37 and 68 so as to allow an expansion in register with said notch of the elastic sleeve 34 and the passage of the material delivered by the transverse channel 36 into the transverse channel 69 between said main channels 37 and 68.

Returning to the embodiment of Figs. 4, 7, 8, 10 and 12 of the apparatus, there may be provided adjacent the exhaust pipes 5 and 6 a prop or rod 71 serving as a bearing for the apparatus during the projection of the material contained therein and also as a stirrer for subsequently mixing the materials when fed into an underlying cup 72 (Figs. 16 and 17).

What I claim is:

1. A container including at least two coaxial compartments adapted to contain each one of at least two materials to be mixed together, an exhaust pipe at one end of each compartment, the exhaust pipes being arranged in side by side relationship, and a material-expelling system adapted to produce the simultaneous delivery out of the different compartments of amounts of material proportional to the cross-sections of the latter.

2. A container including at least two coaxial compartments adapted to contain each one of at least two materials to be mixed together, an exhaust pipe at one end of each compartment, the exhaust pipes being arranged in side by side relationship, and material-expelling pistons engaging simultaneously the corresponding compartments to move through the latter and to urge the material through same and out of the corresponding exhaust pipes in amounts proportional to the cross-sections of the compartments.

3. A container including at least two cylindrical coaxial compartments adapted to contain each one of at least two materials to be mixed together, an exhaust pipe at one end of each compartment, the exhaust pipes being arranged in side by side relationship, and material-expelling pistons engaging simultaneously the corresponding compartments to move through the latter and to urge the material through same and out of the corresponding exhaust pipes in amounts proportional to the cross-sections of the compartments.

4. A container including at least two cylindrical coaxial compartments adapted to contain each one of at least two materials to be mixed together, an exhaust pipe at one end of each compartment, the exhaust pipes being arranged in side by side relationship, and material-expelling pistons engaging simultaneously the corresponding compartments to move through the latter and to urge the material through same and out of the corresponding exhaust pipes in amounts proportional to the cross-sections of the compartments, one of said pistons threadedly engaging the corresponding compartment and adapted to execute a helical movement as it enters the latter.

5. A container including at least two cylindrical coaxial compartments adapted to contain each one of at least two materials to be mixed together, an exhaust pipe at one end of each compartment, the exhaust pipes being arranged in side by side relationship, material-expelling pistons engaging simultaneously the corresponding compartments to move through the latter and to urge the material through same and out of the corresponding exhaust pipes in amounts proportional to the cross-sections of the compartments, one of said pistons threadedly engaging the corresponding compartment and adapted to execute a helical movement as it enters the latter, and means wherethrough said piston, when moving helically in a predetermined direction, produces a longitudinal movement in the corresponding direction of at least one other piston 6. A container including at least two cylindrical coaxial compartments adapted to contain each one of at least two materials to be mixed together, an exhaust pipe at one end of each compartment, the exhaust pipes being arranged in side by side relationship and rigidly interconnected material-expelling pistons engaging simultaneously the corresponding compartments to move through the latter and to urge the material through same and out of the corresponding exhaust pipes in amounts proportional to the cross-sections of the compartments.

7. A container including at least two cylindrical coaxial compartments adapted to contain each one of at least two materials to be mixed together, an exhaust pipe at one end of each compartment, the exhaust pipes being arranged in side by side relationship, and material-expelling pistons including piston heads engaging simultaneously the corresponding compartments to move through the latter and to urge the material through same and out of the corresponding exhaust pipes in amounts proportional to the cross-sections of the compartments, and parts controlling simultaneously the different piston heads.

8. A container including at least two cylindrical coaxial compartments adapted to contain each one of at least two materials to be mixed together, an exhaust pipe at one end of each compartment, the exhaust pipes being arranged in side by side relationship, and material-expelling pistons including each a perforated rigid disc-shaped piston head slidingly mounted in the corresponding compartment, a yielding diaphragm extending underneath each piston head and over the location of the material inside the corresponding compartment and the cross-sectional area of which is equal to that of the corresponding rigid piston head, a fluidtight annular packing provided along each diaphragm edge and slidingly engaging the corresponding sidewall of the compartment, means independent of the disc-shaped piston heads and controlling the movements of the latter in the corresponding compartments to make them move through the latter and urge the material through same and out of the corresponding exhaust pipes in amounts proportional to the cross-sections of the compartments, the diaphragm being adapted to be deformed in direct relationship with the modifications in the compactness of the material in the corresponding compartments and with the consequent modifications in the pressure acting on the diaphragms.

9. A container including at least two cylindrical coaxial compartments adapted to contain each one of at least two materials to be mixed together, an exhaust pipe at one end of each compartment, the exhaust pipes being arranged in side by side relationship, material-expelling pistons including each a reinforcing sleeve slidingly fitted in the corresponding compartment, a yielding diaphragm secured across the lower end of said reinforcing sleeve and clamped by the latter against the inner wall of the compartment, a rigid member fitted inside and above the reinforcing sleeve, and means mechanically independent of and operatively connected with the rigid members of the pistons in the different compartments to make said members move through the latter and urge the material through same and out of the corresponding exhaust pipes in amounts proportional to the cross-sections of the compartments.

10. A container including at least two cylindrical coaxial compartments adapted to contain each one of at least two materials to be mixed together, an exhaust pipe at one end of each compartment, the exhaust pipes being arranged in side by side relationship, material-expelling pistons including each a reinforcing sleeve slidingly fitted in the corresponding compartment, a yielding diaphragm secured across the lower end of said reinforcing sleeve and clamped by the latter against the inner wall of the compartment, a rigid member fitted inside and above the reinforcing sleeve, means mechanically independent of and operatively connected with the rigid members of the pistons in the different compartments to make said members to move through the latter and urge the material through same and out of the corresponding exhaust pipes in amounts proportional to the cross-sections of the compartments, and a flange rigid with the upper end of each reinforcing sleeve and engaging the corresponding rigid member to form a stop for the longitudinal movement of said rigid member.

11. A container including at least two cylindrical coaxial compartments adapted to contain each one of at least two materials to be mixed together, an exhaust pipe at one end of each compartment, the exhaust pipes being arranged in side by side relationship, material-expelling pistons including each a reinforcing sleeve slidingly fitted in the corresponding compartment, a yielding diaphragm secured across the lower end of said reinforcing sleeve and clamped by the latter against the inner wall of the compartment, a rigid member fitted inside and above the reinforcing sleeve, means mechanically independent of and operatively connected with the rigid members of the pistons in the different compartments to make said members move through the latter and urge the materials through same and out of the corresponding exhaust pipes in amounts proportional to the cross-sections of the compartments, and at least one lug rigid with each reinforcing sleeve and engaging the upper section of the corresponding rigid member in longitudinally sliding relationship therewith to oppose any relative radial shifting of the corresponding section of the reinforcing sleeve.

12. A container including at least two cylindrical coaxial compartments adapted to contain each one of at least two materials to be mixed together, an exhaust pipe at one end of each compartment, the exhaust pipes being arranged in side by side relationship, material-expelling pistons including each a reinforcing sleeve slidingly fitted in the corresponding compartment, a yielding diaphragm secured across the lower end of sad reinforcing sleeve and clamped by the latter against the inner wall of the compartment, a rigid member fitted inside and above the reinforcing sleeve, means mechanically independent of and operatively connected with the rigid members of the pistons in the different compartments to make said members move through the latter and urge the material through same and out of the corresponding exhaust pipes in amounts proportional to the cross-sections of the compartments, and at least one lug rigid with each reinforcing sleeve and engaging the upper section of the corresponding rigid member in longitudinally sliding relationship therewith to oppose any relative radial shifting of the corresponding section of the reinforcing sleeve, each lug including an inturned section at its free end to form a stop for the movement of the corresponding rigid member with reference to the reinforcing sleeve between the diaphragm and the means controlling said rigid member, said lugs being adapted to be drawn out of the compartments with the sleeves and associated rigid members.

13. A container including at least two cylindrical coaxial compartments adapted to contain each one of at least two materials to be mixed together, an exhaust pipe at one end of each compartment, the exhaust pipes being arranged in side by side relationship, material-expelling pistons, including each a reinforcing sleeve slidingly fitted in the corresponding compartment, a yielding diaphragm secured across the lower end of said reinforcing sleeve and clamped by the latter against the inner wall of the compartment, a cup-shaped rigid member provided with a longitudinal slot closed at both ends, fitted inside and above the reinforcing sleeve, at least one tongue radially rigid with each reinforcing sleeve and extending through the slot in the corresponding rigid cup-shaped member to define the ends of the stroke of said rigid member with reference to the reinforcing sleeve, said tongues being adapted to be drawn out of the corresponding compartments through their free ends to provide for the removal of the sleeves and rigid members out of the said corresponding compartments, and means mechanically independent of and operatively connected with the rigid members of the pistons in the different compartments to make them move through the latter and urge the material through same and out of the corresponding exhaust pipes in amounts proportional to the cross-sections of the compartments.

14. A container including at least two cylindrical coaxial compartments adapted to contain each one of at least two materials to be mixed together, an exhaust pipe at one end of each compartment, the exhaust pipes being arranged in side by side relationship, material-expelling pistons including each a reinforcing sleeve slidingly fitted in the corresponding compartment, a yielding diaphragm secured across the lower end of said reinforcing sleeve and urged by the latter against the inner wall of the compartment, one at least of which diaphragms is made of metal, a rigid member fitted inside and above the reinforcing sleeve, and means mechanically independent of and operatively connected with the rigid members of the pistons in the different compartments to make them move through the latter and urge the material through same and out of the corresponding exhaust pipes in amounts proportional to the cross-sections of the compartments.

15. A container including at least two cylindrical coaxial compartments adapted to contain each one of at least two materials to be mixed together, an exhaust pipe at one end of each compartment, the exhaust pipes being arranged in side by side relationship, a common cover yieldingly connected with the container and adapted to close the exhaust pipes, and material-expelling pistons engaging simultaneously the corresponding compartments to move through the latter and to urge the material through same and out of the corresponding exhaust pipes in amounts proportional to the cross-sections of the compartments.

16. A container including at least two cylindrical coaxial compartments adapted to contain each one of at least two materials to be mixed together, an exhaust pipe at one end of each compartment, the exhaust pipes being arranged in side by side relationship, at least one of these exhaust pipes being fitted with an exhaust valve adapted to close it and material-expelling pistons engaging simultaneously the corresponding compartments to move through the latter and to urge the material through same and out of the corresponding exhaust pipes in amounts proportional to the cross-sections of the compartments.

17. A container including at least two cylindrical coaxial compartments adapted to contain each one of at least two materials to be mixed together, an exhaust pipe at one end of each compartment, the exhaust pipes being arranged in side by side relationship, at least one of these exhaust pipes being provided with a lateral exhaust port and an exhaust valve including an elastic sheath fitted over the corresponding exhaust pipe and covering its lateral exhaust port, and material-expelling pistons engaging simultaneously the corresponding compartments to move through the latter and to urge the material through same and out of the corresponding exhaust pipes in amounts proportional to the cross-sections of the compartments.

18. A container including at least two cylindrical coaxial compartments adapted to contain each one of at least two materials to be mixed together, an exhaust pipe at one end of each compartment, the exhaust pipes being arranged in side by side relationship, at least one of these exhaust pipes being provided with a lateral exhaust port, and an exhaust valve including an elastic sheath fitted over the corresponding exhaust pipe and covering its lateral exhaust port, a spring blade urging each sheath against the corresponding lateral port, and material-expelling pistons engaging simultaneously the corresponding compartments to move through the latter and urge the materials through same and out of the corresponding exhaust pipes in amounts proportional to the cross-sections of the compartments.

19. A container including at least two cylindrical coaxial compartments adapted to contain each one of at least two materials to be mixed together, an exhaust pipe at one end of each compartment, the exhaust pipes being arranged in side by side relationship, at least one of the exhaust pipes being provided with two main aligned longitudinal channels stopping short of each other and communicating respectively with the corresponding compartment and with the outside of the free end of the pipe, the said exhaust pipe being further provided with two radial parallel channels connecting the cooperating ends of the two main channels in the pipes with the outer surface of the said pipe, an elastic sheath forming an exhaust valve covering yieldingly the outer ends of the two radial channels in the said pipe and the ends of which are fluidtightly secured to the outer solid wall of the said pipe and material-expelling pistons engaging simultaneously the corresponding compartments to move through the latter and to urge the material through same and out of the corresponding exhaust pipes in amounts proportional to the cross-section of the compartments.

20. A container including at least two cylindrical coaxial compartments adapted to contain each one of at least two materials to be mixed together, an exhaust pipe at one end of each compartment, the exhaust pipes being arranged in side by side relationship, material-expelling pistons, including each a reinforcing sleeve slidingly fitted in the corresponding compartment, a yielding diaphragm secured across the lower end of said reinforcing sleeve and clamped by the latter against the inner wall of the compartment, a cup-shaped rigid member provided with a longitudinal slot closed at both ends, fitted inside and above the reinforcing sleeve, at least one tongue radially rigid with each reinforcing sleeve and extending through the slot in the corresponding rigid cup-shaped member to define the ends of the stroke of said rigid member with reference to the reinforcing sleeve, said tongues being adapted to be drawn out of the corresponding compartments through their free ends to provide for the removal of the sleeves and rigid member out of the said corresponding compartments and an independent piston rod threadedly engaging the central compartment and adapted to execute a helical movement as it enters the latter and moves the corresponding cup-shaped rigid member in the direction of the corresponding exhaust pipe, the said piston rod being rigidly connected with at least one tubular member entering simultaneously the surrounding compartment and moving the corresponding cup-shaped rigid member in the direction of the corresponding exhaust pipe so that the material is simultaneously urged out of the exhaust pipes of the different compartments in amounts proportional to their cross-section.

References Cited in the file of this patent

UNITED STATES PATENTS

| | | |
|---|---|---|
| 595,942 | Diehl et al. | Dec. 21, 1897 |
| 1,609,424 | Paul | Dec. 7, 1926 |
| 1,765,844 | Maynard et al. | June 24, 1930 |
| 2,099,252 | Bagby | Nov. 16, 1937 |
| 2,732,187 | Benedetto | Jan. 24, 1956 |